(12) United States Patent
Adams et al.

(10) Patent No.: US 8,676,857 B1
(45) Date of Patent: Mar. 18, 2014

(54) CONTEXT-BASED SEARCH FOR A DATA STORE RELATED TO A GRAPH NODE

(75) Inventors: Samuel S. Adams, Rutherfordton, NC (US); Robert R. Friedlander, Southbury, CT (US); John K. Gerken, III, Apex, NC (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/592,905

(22) Filed: Aug. 23, 2012

(51) Int. Cl.
*G06F 17/30* (2006.01)

(52) U.S. Cl.
CPC ............................. *G06F 17/30958* (2013.01)
USPC ........... 707/798; 707/706; 709/204; 709/224; 709/226

(58) Field of Classification Search
CPC .................................................. G06F 17/30958
USPC .................. 707/798, 706; 709/204, 224, 226
See application file for complete search history.

(56) References Cited

U.S. PATENT DOCUMENTS

| | | | |
|---|---|---|---|
| 5,664,179 A | | 9/1997 | Tucker |
| 5,689,620 A | | 11/1997 | Kopec et al. |
| 5,701,460 A | * | 12/1997 | Kaplan et al. ................. 707/748 |
| 5,974,427 A | | 10/1999 | Reiter |
| 6,199,064 B1 | | 3/2001 | Schindler |
| 6,275,833 B1 | | 8/2001 | Nakamura et al. |
| 6,314,555 B1 | * | 11/2001 | Ndumu et al. ................. 717/101 |
| 6,334,156 B1 | | 12/2001 | Matsuoka et al. |
| 6,553,371 B2 | | 4/2003 | Gutierrez-Rivas et al. |
| 6,633,868 B1 | * | 10/2003 | Min et al. ...................... 707/769 |
| 6,768,986 B2 | | 7/2004 | Cras et al. |
| 7,058,628 B1 | | 6/2006 | Page |
| 7,337,174 B1 | | 2/2008 | Craig |
| 7,441,264 B2 | | 10/2008 | Himmel et al. |
| 7,523,118 B2 | | 4/2009 | Friedlander et al. |
| 7,523,123 B2 | | 4/2009 | Yang et al. |
| 7,571,163 B2 | | 8/2009 | Trask |
| 7,748,036 B2 | | 6/2010 | Speirs, III et al. |

(Continued)

FOREIGN PATENT DOCUMENTS

| | | |
|---|---|---|
| EP | 1566752 A2 | 8/2005 |
| EP | 1843259 A2 | 10/2007 |
| WO | 2006086179 A2 | 8/2006 |
| WO | 2007044763 A2 | 4/2007 |

OTHER PUBLICATIONS

James Cheng et al., Context-Aware Object Connection Discovery in Large Graphs., Hong Kong University of Science and Technology and Chinese Unversity of Hong Kong.*

(Continued)

*Primary Examiner* — Shahid Alam
*Assistant Examiner* — Nargis Sultana
(74) *Attorney, Agent, or Firm* — John R. Pivnichny; Law Office of Jim Boice

(57) ABSTRACT

A graph database storage system contains a graph database that has multiple graph nodes. A first pointer points from a particular graph node to a particular synthetic context event node in a synthetic context event database. A second pointer points from the particular synthetic context event node in the synthetic context event database to a particular data store in a data structure, such that the first pointer and the second pointer associate the particular data store with the particular entity represented in the graph database via the particular synthetic context event node.

20 Claims, 3 Drawing Sheets

(56) References Cited

U.S. PATENT DOCUMENTS

| | | | |
|---|---|---|---|
| 7,752,154 B2 | 7/2010 | Friedlander et al. | |
| 7,778,955 B2 | 8/2010 | Kuji | |
| 7,783,586 B2 | 8/2010 | Friedlander et al. | |
| 7,788,202 B2 | 8/2010 | Friedlander et al. | |
| 7,788,203 B2 | 8/2010 | Friedlander et al. | |
| 7,792,774 B2 | 9/2010 | Friedlander et al. | |
| 7,792,776 B2 | 9/2010 | Friedlander et al. | |
| 7,792,783 B2 | 9/2010 | Friedlander et al. | |
| 7,797,319 B2 | 9/2010 | Piedmonte | |
| 7,805,390 B2 | 9/2010 | Friedlander et al. | |
| 7,805,391 B2 | 9/2010 | Friedlander et al. | |
| 7,809,660 B2 | 10/2010 | Friedlander et al. | |
| 7,853,611 B2 | 12/2010 | Friedlander et al. | |
| 7,870,113 B2 | 1/2011 | Gruenwald | |
| 7,877,682 B2* | 1/2011 | Aegerter | 715/237 |
| 7,930,262 B2 | 4/2011 | Friedlander et al. | |
| 7,953,686 B2 | 5/2011 | Friedlander et al. | |
| 7,970,759 B2 | 6/2011 | Friedlander et al. | |
| 7,996,393 B1 | 8/2011 | Nanno et al. | |
| 8,046,358 B2 | 10/2011 | Thattil | |
| 8,055,603 B2* | 11/2011 | Angell et al. | 706/47 |
| 8,069,188 B2 | 11/2011 | Larson et al. | |
| 8,086,614 B2 | 12/2011 | Novy | |
| 8,145,582 B2* | 3/2012 | Angell et al. | 706/45 |
| 8,150,882 B2 | 4/2012 | Meek et al. | |
| 8,155,382 B2 | 4/2012 | Rubenstein | |
| 8,161,048 B2* | 4/2012 | Procopiuc et al. | 707/737 |
| 8,199,982 B2 | 6/2012 | Fueyo et al. | |
| 8,234,285 B1 | 7/2012 | Cohen | |
| 8,250,581 B1 | 8/2012 | Blanding | |
| 8,341,626 B1 | 12/2012 | Gardner et al. | |
| 2002/0184401 A1 | 12/2002 | Kadel et al. | |
| 2003/0149562 A1 | 8/2003 | Walther | |
| 2004/0153461 A1 | 8/2004 | Brown et al. | |
| 2004/0162838 A1 | 8/2004 | Murayama et al. | |
| 2006/0004851 A1 | 1/2006 | Gold et al. | |
| 2006/0190195 A1 | 8/2006 | Watanabe et al. | |
| 2006/0271586 A1 | 11/2006 | Federighi et al. | |
| 2007/0006321 A1 | 1/2007 | Bantz et al. | |
| 2007/0185850 A1 | 8/2007 | Walters et al. | |
| 2007/0282916 A1 | 12/2007 | Albahari et al. | |
| 2007/0300077 A1 | 12/2007 | Mani et al. | |
| 2008/0086442 A1 | 4/2008 | Dasdan et al. | |
| 2008/0091503 A1 | 4/2008 | Schirmer et al. | |
| 2008/0133474 A1 | 6/2008 | Hsiao et al. | |
| 2008/0208838 A1* | 8/2008 | Friedlander et al. | 707/723 |
| 2008/0208901 A1* | 8/2008 | Friedlander et al. | 707/805 |
| 2008/0281801 A1* | 11/2008 | Larson et al. | 707/713 |
| 2008/0306926 A1 | 12/2008 | Friedlander et al. | |
| 2009/0287676 A1 | 11/2009 | Dasdan | |
| 2009/0299988 A1* | 12/2009 | Hamilton et al. | 707/723 |
| 2009/0327632 A1 | 12/2009 | Glaizel et al. | |
| 2010/0070640 A1 | 3/2010 | Allen et al. | |
| 2010/0088322 A1 | 4/2010 | Chowdhury et al. | |
| 2010/0131293 A1 | 5/2010 | Linthicum et al. | |
| 2010/0179933 A1 | 7/2010 | Bai et al. | |
| 2010/0191747 A1 | 7/2010 | Ji et al. | |
| 2010/0241644 A1* | 9/2010 | Jackson et al. | 707/760 |
| 2010/0257198 A1 | 10/2010 | Cohen et al. | |
| 2010/0274785 A1* | 10/2010 | Procopiuc et al. | 707/737 |
| 2011/0040724 A1 | 2/2011 | Dircz | |
| 2011/0066649 A1 | 3/2011 | Berlyant et al. | |
| 2011/0077048 A1 | 3/2011 | Busch | |
| 2011/0087678 A1 | 4/2011 | Frieden et al. | |
| 2011/0123087 A1 | 5/2011 | Nie et al. | |
| 2011/0137882 A1 | 6/2011 | Weerasinghe | |
| 2011/0194744 A1 | 8/2011 | Wang et al. | |
| 2011/0208688 A1 | 8/2011 | Ivanov et al. | |
| 2011/0246498 A1 | 10/2011 | Forster | |
| 2011/0301967 A1 | 12/2011 | Friedlander et al. | |
| 2011/0314155 A1 | 12/2011 | Narayanaswamy et al. | |
| 2012/0016715 A1 | 1/2012 | Brown et al. | |
| 2012/0023141 A1* | 1/2012 | Holster | 707/798 |
| 2012/0079493 A1 | 3/2012 | Friedlander et al. | |
| 2012/0131139 A1 | 5/2012 | Siripurapu et al. | |
| 2012/0131468 A1 | 5/2012 | Friedlander et al. | |
| 2012/0191704 A1 | 7/2012 | Jones | |
| 2012/0221439 A1* | 8/2012 | Sundaresan et al. | 705/26.61 |
| 2012/0239761 A1* | 9/2012 | Linner et al. | 709/206 |
| 2012/0246148 A1 | 9/2012 | Dror | |
| 2012/0259841 A1 | 10/2012 | Hsiao et al. | |
| 2012/0278897 A1 | 11/2012 | Ang et al. | |
| 2012/0281830 A1 | 11/2012 | Stewart et al. | |
| 2012/0311587 A1 | 12/2012 | Li et al. | |
| 2012/0316821 A1 | 12/2012 | Levermore et al. | |
| 2012/0330958 A1 | 12/2012 | Xu et al. | |
| 2013/0019084 A1 | 1/2013 | Orchard et al. | |
| 2013/0031302 A1 | 1/2013 | Byom et al. | |
| 2013/0124564 A1 | 5/2013 | Oztekin et al. | |
| 2013/0173585 A1* | 7/2013 | Friedlander et al. | 707/713 |

OTHER PUBLICATIONS

R. Angles et al., "Survey of Graph Database Models", ACM Computing Surveys, vol. 40, No. 1, Article 1, Feb. 2008, pp. 1-65.

U.S. Appl. No. 13/342,406—Non-Final Office Action Mailed Sep. 27, 2013.

U.S. Appl. No. 13/610,347—Non-Final Office Action Mailed Jul. 19, 2013.

U.S. Appl. No. 13/610,347—Notice of Allowance Mailed Aug. 19, 2013.

M.J. Flynn, et al., "Sparse Distributed Memory Principles of Operation", Research Institute for Advanced Computer Science, 1989, pp. 1-60.

P. Kanerva, "Hyperdimensional Computing: an Introduction to Computing in Distributed Representation With High-Dimensional Random Vectors", Springer Science+Business Media, LLC, COGN Comput, 1, 2009, pp. 139-159.

P. Kanerva, "What We Mean When We Say "What'S the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al., "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al., "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

U.S. Appl. No. 13/342,305, Friedlander et al.—Specification filed Jan. 3, 2012.

K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.

W. Caid et al., "Context Vector-Based Text Retrieval", Fair Isaac Corporation, Aug. 2003, pp. 1-20.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

Visual Paradigm, "DB Visual Architect 4.0 Designer'S Guide: Chapter 6—Mapping Object Model to Data Model and Vice Versa", 2007, pp. 6-2-6-26.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Avinash Kaushik, "End of Dumb Tables in Web Analytics Tools! Hello: Weighted Sort", Sep. 7, 2010, www.kaushik.net, pp. 1-15.

(56) References Cited

OTHER PUBLICATIONS

Evaggelio Pitoura et al., "Context in Databases", University of Ioannina, Greece, 2004, pp. 1-19.

U.S. Appl. No. 13/562,714, Robert R. Friedlander, et al.—Specification and Drawings filed July 31, 2012.

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

* cited by examiner

CONTEXT-BASED SEARCH FOR A DATA STORE RELATED TO A GRAPH NODE

BACKGROUND

The present disclosure relates to the field of computers, and specifically to the use of databases in computers. Still more particularly, the present disclosure relates to a context-based search for data related to entities described in a graph database.

A database is a collection of data. Examples of database types include relational databases, graph databases, network databases, and object-oriented databases. Each type of database presents data in a non-dynamic manner, in which the data is statically stored.

SUMMARY

In one embodiment of the present invention, a context-based system for searching for data stores related to a set of one or more nodes in a graph database is presented. A graph database storage system contains a graph database comprising multiple graph nodes. A first pointer points from a particular graph node to a particular synthetic context event node in a synthetic context event database. A second pointer points from the particular synthetic context event node in the synthetic context event database to a particular data store in a data structure, such that the first pointer and the second pointer associate the particular data store with the particular entity represented in the graph database via the particular synthetic context event node.

In one embodiment, a processor-implemented method searches for data stores related to a set of one or more nodes in a graph database. A processor points from a particular graph node in a graph database to a particular synthetic context event node in a synthetic context event database. The graph database comprises multiple graph nodes, where each of the multiple graph nodes stores an attribute of a particular entity. Each of the multiple graph nodes is logically coupled to another graph node by an edge, which describes a relationship between entities represented by coupled graph nodes. The synthetic context event database is made up of multiple synthetic context event nodes, where each of the synthetic context event nodes contains a descriptor of the attribute of the particular entity as well as the relationship between the particular entity and another entity represented by another graph node. The processor then points from a particular synthetic context event node in the synthetic context event database to a particular data store in a data structure, such that pointing to the particular data store associates the particular data store with the particular entity represented in the graph database via the particular synthetic context event node.

In one embodiment, a computer program product searches for data stores related to a set of one or more nodes in a graph database. Stored on a computer readable storage medium are first program instructions and second program instructions. The first program instructions are to point from a particular data store in a data structure to a particular synthetic context event node in a synthetic context event database, where the synthetic context event database comprises multiple synthetic context event nodes. The particular synthetic context event node contains a descriptor of an attribute of a particular entity represented by a particular graph node in a graph database, and the particular synthetic context event node further contains a relationship described in an edge between said particular graph node and another graph node in the graph database. The second program instructions are to point from the particular synthetic context event node in the synthetic context event database to the particular graph node in the graph database, such that pointing to the particular synthetic context event node and the particular graph node associates the particular data store with the particular entity represented by the graph node via the particular synthetic context event node.

DETAILED DESCRIPTION

Figure 1:
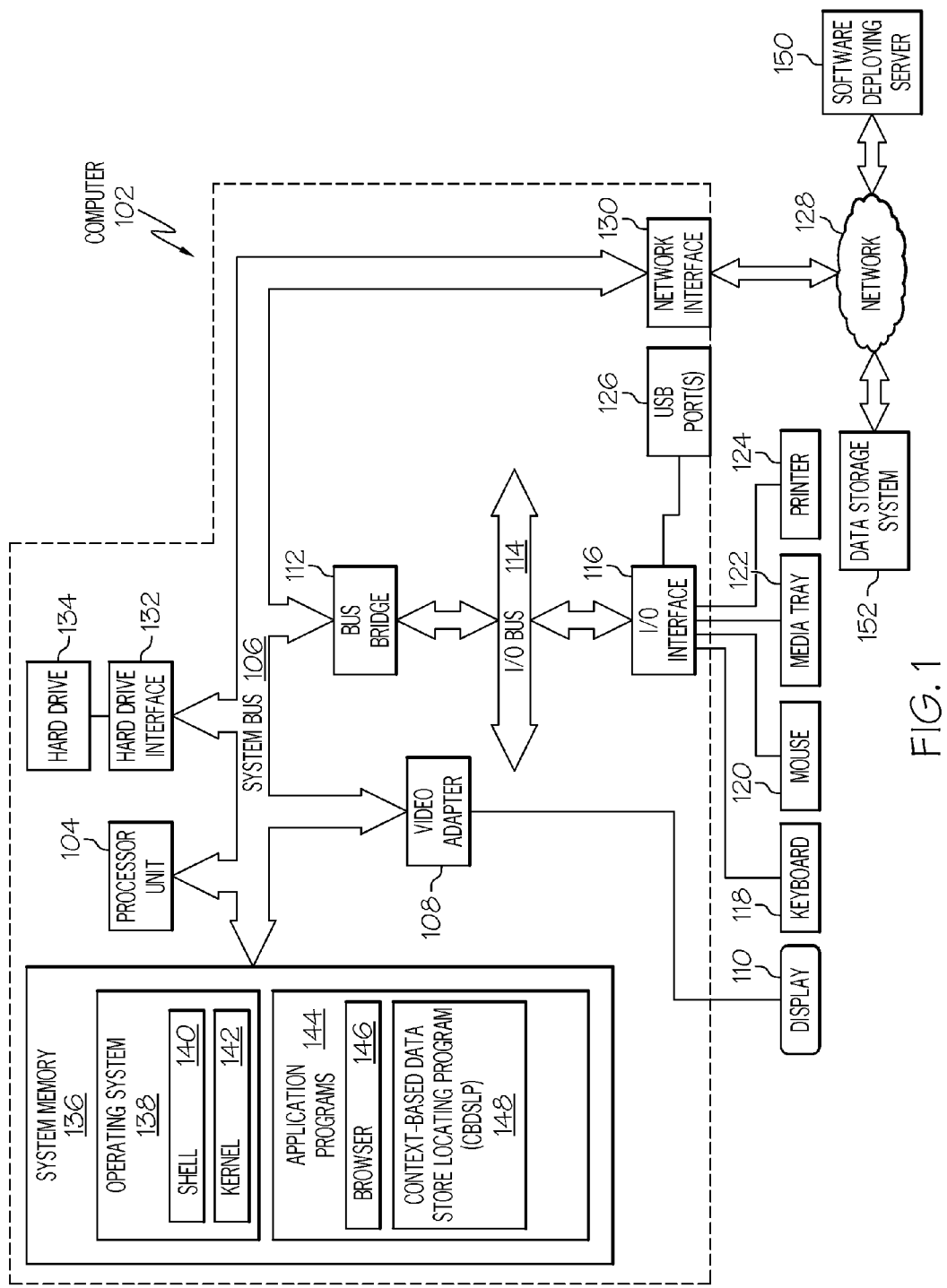
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150 and/or a data storage system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a context-based data store locating program (CBDSLP) 148. CBDSLP 148 includes code for implementing the processes described below, including those described in FIGS. 2-3. In one embodiment, computer 102 is able to download CBDSLP 148 from software deploying server 150, including in an on-demand basis, wherein the code in CBDSLP 148 is not downloaded until needed for execution. Note further that, in one embodiment of the present invention, software deploying server 150 performs all of the functions associated with the present invention (including execution of CBDSLP 148), thus freeing computer 102 from having to use its own internal computing resources to execute CBDSLP 148.

The data storage system 152 stores an electronic data structure, which may be business/medical records, audio files, video files, website entries, text files, etc. In one embodiment, computer 102 contains the graph database storage system and the synthetic context event database storage system described and claimed herein, while the data storage system is a same or separate system for storing data stores as described and claimed herein.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
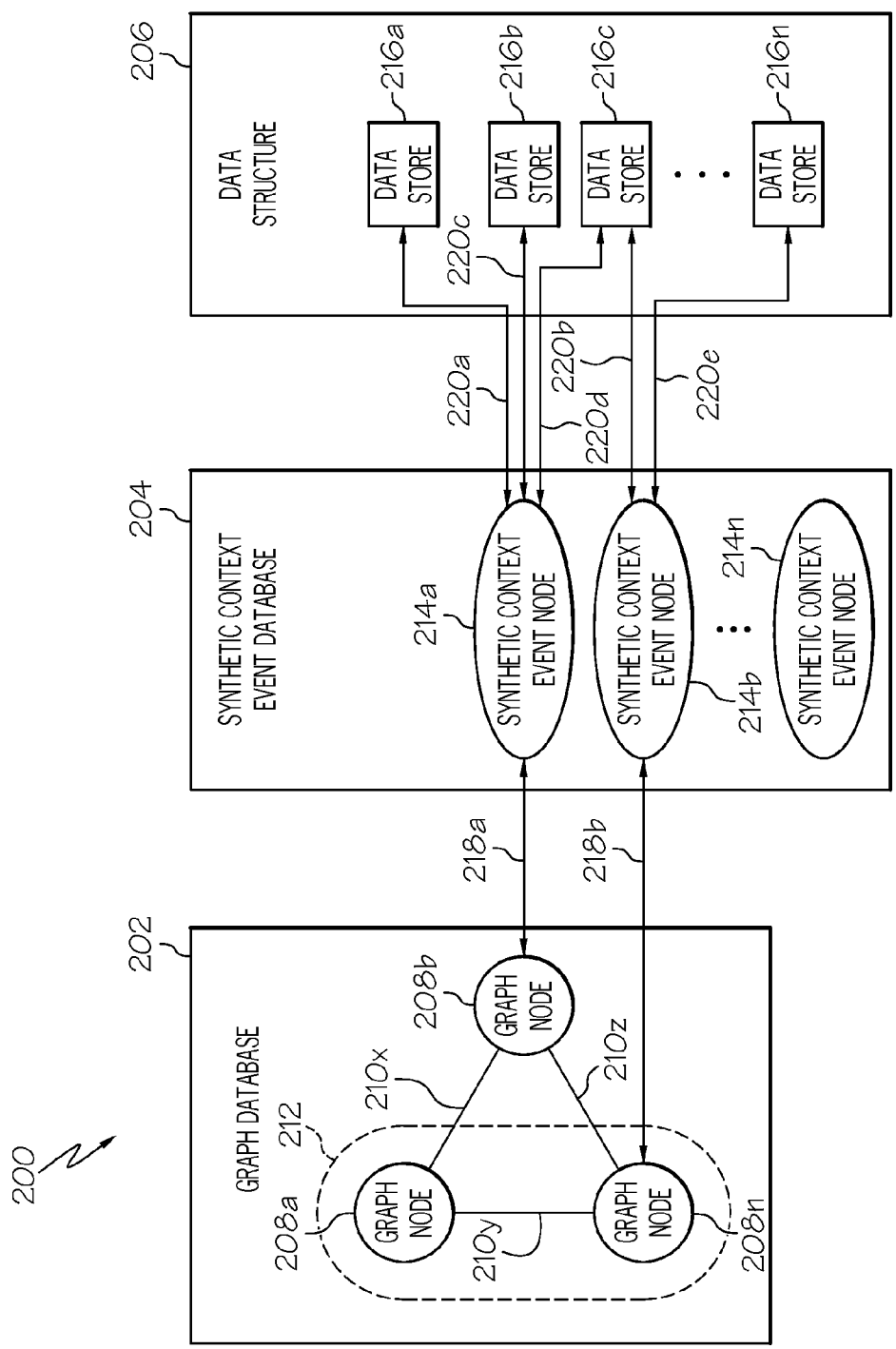
FIG. 2 illustrates a novel context-based system for searching for data stores related to an entity described by a set of one or more nodes in a graph database.

Note that CBDSLP 148 is able to generate and/or utilize some or all of the databases depicted in the context-based system in FIG. 2.

With reference now to FIG. 2, a novel context-based system 200 for searching for data stores related to an entity described by a set of one or more nodes in a graph database is presented. The context-based system 200 comprises a graph database storage system for storing a graph database 202, a synthetic context event database storage system for storing a synthetic context event database 204, and access to a data storage system for storing a data structure 206. In one embodiment, the graph database storage system and the synthetic context event database storage system are part of computer 102 shown in FIG. 1, while the data storage system is the data storage system 152 depicted in FIG. 1.

The graph database 202 is a schema-less database in which data is organized as a set of nodes (objects) with properties (attributes or values). These nodes are linked to other nodes through edges, which describe the relationship between two nodes. As depicted in FIG. 2, these nodes are shown as graph nodes 208a-208n, where "n" is an integer. The graph nodes 208a-208n are linked by edges 210x-210z, which describe relationships between linked graph nodes. For example, assume that graph node 208a represents "circulatory diseases" (or persons having a circulatory disease), and graph node 208b represented "myocardial infarction" (or persons who are having or have had a myocardial infarction). The edge 210x thus describes the graph node 208b as being a subset of graph node 208a.

In another example, assume that graph node 208b still represents persons who have had a myocardial infarction, and graph node 208n represents all persons who are morbidly obese, live in a certain city/state/country/geographical region, drink green tea, etc. The edge 210z would thus describe the persons represented by graph node 208b as "being morbidly obese", "a resident of the certain city/state/country/geographical region", a "drinker of green tea", etc.

In one embodiment, two or more graph nodes can be clustered into a graph node cluster 212, which includes graph node 208a and graph node 208n. This graph node cluster 212 has been predetermined to include all related graph nodes (as indicated by linking edges and/or shared attributes within the graph nodes).

The synthetic context event database 204 is made up of synthetic context event nodes 214a-214n (where "n" is an integer). These synthetic context event nodes 214a-214n may or may not be interlinked (i.e., logically associated with one another by having shared attributes, etc.). Each of these synthetic context event nodes 214a-214n represents a synthetic event (i.e., they are fabricated by consolidating information from different sources which may or may not describe an actual event). In the present invention, each of the synthetic context event nodes 214a-214n contains a descriptor of an attribute of a particular entity (i.e., information from one or more of the graph nodes 208a-208n) and a relationship between a particular entity and another entity represented by another graph node (i.e., the information found in an edge such as edge 210x).

The data structure 206 is a database of multiple data stores 216a-216n, which may be text documents, hierarchical files, tuples, object oriented database stores, spreadsheet cells, uniform resource locators (URLs), etc.

In one embodiment, the data structure 206 is a database of text documents (represented by one or more of the data stores 216a-216n), such as journal articles, webpage articles, electronically-stored business/medical/operational notes, etc.

In one embodiment, the data structure 206 is a database of text, audio, video, multimedia, etc. files (represented by one or more of the data stores 216a-216n) that are stored in a hierarchical manner, such as in a tree diagram, a lightweight directory access protocol (LDAP) folder, etc.

In one embodiment, the data structure 206 is a relational database, which is a collection of data items organized through a set of formally described tables. A table is made up of one or more rows, known as "tuples". Each of the tuples (represented by one or more of the data stores 216a-216n) share common attributes, which in the table are described by column headings. Each tuple also includes a key, which may be a primary key or a foreign key. A primary key is an identifier (e.g., a letter, number, symbol, etc.) that is stored in a first data cell of a local tuple. A foreign key is typically identical to the primary key, except that it is stored in a first data cell of a remote tuple, thus allowing the local tuple to be logically linked to the foreign tuple.

In one embodiment, the data structure 206 is an object oriented database, which stores objects (represented by one or more of the data stores 216a-216n). As understood by those skilled in the art of computer software, an object contains both attributes, which are data (i.e., integers, strings, real numbers, references to another object, etc.), as well as methods, which are similar to procedures/functions, and which define the behavior of the object. Thus, the object oriented database contains both executable code and data.

In one embodiment, the data structure 206 is a spreadsheet, which is made up of rows and columns of cells (represented by one or more of the data stores 216a-216n). Each cell (represented by one or more of the data stores 216a-216n) contains numeric or text data, or a formula to calculate a value based on the content of one or more of the other cells in the spreadsheet.

In one embodiment, the data structure 206 is a collection of universal resource locators (URLs) for identifying a webpage, in which each URL (or a collection or URLs) is represented by one or more of the data stores 216a-216n.

These described types of data stores are exemplary, and are not to be construed as limiting what types of data stores are found within data structure 206.

Note that the data structure 206 is homogenous in one embodiment, while data structure 206 is heterogeneous in another embodiment. For example, assume in a first example that data structure 206 is a relational database, and all of the data stores 216a-216n are tuples. In this first example, data structure 206 is homogenous, since all of the data stores 216a-216n are of the same type. However, assume in a second example that data store 216a is a text document, data store 216b is an MRI image, data store 216c is a tuple from a relational database, etc. In this second example, data structure 206 is a heterogeneous data structure, since it contains data stores that are of different formats.

In one embodiment, the synthetic context event database 204 may include filtering logic (i.e., part of CBDSLP 148 shown in FIG. 1), which allows the user to specify what type of data store is to be located. For example, such a filter may request only image files (e.g., an MRI image), or it may request only text files (e.g., journal articles), or it may request only universal resource locators (URLs) to websites, or it may request only tuples from a relational database, or it may request any combination of data stores (i.e., a combination of data stores that are inclusive of some types of data stores and are exclusive of other types of data stores).

As depicted in FIG. 2, a first pointer points to one of the synthetic context event nodes 214a-214n, and a second pointer points from one of the synthetic context event nodes 214a-214n to one of the data stores 216a-216n. For example, assume that graph node 208b represents persons who have had a myocardial infarction, and information from edge 210x and/or edge 210z describes those persons' relationships to entities represented by graph node 208a and graph node 208n, respectively. In this example, synthetic context event node 214a contains the information stored in graph node 208b as well as the information stored in edge 210x and/or edge 210z. In order to associate the synthetic context event node 214a with graph node 208b and its edges, a first pointer 218a points from graph node 208b to synthetic context event node 214a.

Similarly, a first pointer 218b points from graph node cluster 212, which includes graph node 208a and graph node 208n, as well as the information in edge 210y, to a synthetic context event node 214b. In one embodiment, only the information found in graph node 208a, graph node 208n, and edge 210y are represented in synthetic context event node 214b. In another embodiment, the information found in graph node 208a, graph node 208n, and edge 210y, as well as the information found in edge 210x and/or edge 210z are also represented in synthetic context event node 214b.

As further depicted in FIG. 2, a second pointer points from a synthetic context event node, which was pointed to by the first pointer, to a particular data store in the data structure, such that the first pointer and the second pointer associate the particular data store with the particular entity represented in the graph database via the particular synthetic context event node. For example, continue to assume that graph node 208b represents persons who have had a myocardial infarction; that information from edge 210x and/or edge 210z describes those persons' relation to entities represented by graph node 208a and graph node 208n, respectively; that synthetic context event node 214a contains the information stored in graph node 208b as well as the information stored in edge 210x and/or edge 210z; and that first pointer 218a points from graph node 208b to synthetic context event node 214a. Second pointer 220a now points from synthetic content event node 214a to data store 216a, ultimately resulting in the linkage of graph node 208b to data store 216a via synthetic context event node 214a.

Second pointer 220a points to (i.e., identifies and/or retrieves) data store 216a according to a logical relationship between the synthetic context event node 214a and the data store 216a. For example, assume that synthetic context event node 214a contains entries (i.e., information from graph node 208b and/or edges 210x and/or 210z) that match descriptive data such as a keyword, metadata, context-based mined data, etc. found in data store 216a. In one embodiment, this descriptive data describes an activity related to the entity described in graph node 208b. For example, graph node 208b may describe the person's lifestyle (i.e., smoker, runner, etc.), medical history (i.e., has had a particular medical procedure, other disease, treatment in a particular facility or by a particular doctor, etc.), travel history, etc.

If the first pointer 218b points from graph node cluster 212 to synthetic context event node 214b, then second pointer 220b points to data store 216c, and/or second pointer 220e points to data store 216n, thus associating graph node cluster 212 with data store 216c and/or data store 216n.

Note that, in one embodiment, the single synthetic context event node 214a has a first second pointer 220c as well as a second second pointer 220d, which point to different data stores 216b and 216c. That is, multiple data stores, which may be of the same (i.e., are all magazine articles, web entries, etc.) or different (i.e., one is a text file, one is a video file, etc.) types of data stores. Thus, the term data store is used to describe any type of stored file (i.e., text, video, etc.).

Thus, as described above and depicted in FIG. 2, a context-based system 200 for searching for data stores related to a set of one or more nodes in a graph database is represented. A graph database storage system (i.e., part of computer 102 shown in FIG. 1) contains a graph database 202 made up of multiple graph nodes 208a-208n. Each of the multiple graph nodes 208a-208n stores an attribute of a particular entity, and each of the multiple graph nodes 208a-208n is logically coupled to another graph node by one or more of the edges 210x-210z, where each edge describes a relationship between entities represented by coupled graph nodes.

A first pointer (e.g., first pointer 218a) points from a particular graph node (e.g., graph node 208b) to a particular synthetic context event node (e.g., synthetic context event node 214a) in the synthetic context event database 204. A synthetic context event database storage system (i.e., also part of computer 102 shown in FIG. 1) contains the synthetic context event database 204, which contains multiple synthetic context event nodes 214a-214n. Each of the multiple synthetic context event nodes 214a-214n contains a descriptor of one or more attributes of the particular entity represented by graph node 208b, as well as the relationship (e.g., found in edge 210x) between that particular entity and another entity represented by another graph node (e.g., graph node 208a).

A second pointer (e.g., second pointer 220a) points from the particular synthetic context event node 214a in the synthetic context event database 204 to a particular data store 216a in a data structure 206. Thus, the first pointer 218a and the second pointer 220a associate the particular data store 216a with the particular entity represented in the graph database (i.e., by graph node 208b) via the particular synthetic context event node 214a.

Note that data stores 216a-216n within data structure 206 do not merely describe or provide additional detail about the information found in a graph node from the graph database 202 and/or the edges 210x-210z that connect various graph nodes. Rather, these data stores 216a-216n are data stores that are deemed to be related to a particular graph node by a particular synthetic context event node. That is, a particular data store from data stores 216a-216n is deemed to be associated to a particular intermediate synthetic context event node by virtue of the contextual information (i.e., information supplied by one or more graph nodes and/or their edges) found in that particular intermediate synthetic context event node. The data store itself, however, is not merely an expansion of this contextual information, but rather is a data store that describes a study, analysis, evaluation, entity association, etc. of the entity(s) described by the relevant graph node(s).

For example, data store 216a may be a medical journal article that has been associated with synthetic context event node 214a (e.g., by containing certain keywords, metadata, etc.). This medical journal article does not merely describe the information from graph node 208b and/or the edges to that graph node 208b, but rather provides medical details about a particular medical study. These medical details include those not suggested by the information from the graph node 208b and/or the edges to that graph node 208b.

For example, in one embodiment, the particular data store (e.g., data store 216a) describes an activity (i.e., lifestyle, medical activities/history, hobbies, travel history, etc.) related to the particular entity depicted by graph node 208b.

In another exemplary embodiment, the particular data store (e.g., data store 216a) describes a set of diagnostic and/or treatment options for medical patients described by graph node 208b.

In another exemplary embodiment, the particular data store (e.g., data store 216a) describes a set of financial, legal, technical, etc. reports related to a business entity described by graph node 208b.

In order to link a particular synthetic context event node to a particular data store, various linkage processes may be utilized. For example, in one embodiment, the second pointer 220a uses a keyword that is in both the particular synthetic context event node 214a and the particular data store 216a to point to the particular data store 216a. In another exemplary embodiment, the second pointer 220a uses metadata that is associated with both the particular synthetic context event node 214a and the particular data store 216a to point to the particular data store 216a.

In one embodiment, multiple second pointers (e.g., second pointers 220a, 220c and 220d) point from the particular synthetic context event node 214a to multiple data stores 216a, 216b and 216c in the data structure 206.

In one embodiment, a first second pointer 220d from a first synthetic context event node 214a and a second second pointer 220b from a second synthetic context event node 214b point to a same data store 216c in the data structure 206. That is, a same data store 216c may be relevant to two synthetic context event nodes, and thus related to two different graph nodes and/or graph node clusters.

In one embodiment, the data structure 206 is a relational database, such that the particular data store (e.g., data store 216a) is a tuple within the relational database.

In one embodiment, the data structure 206 is a text data structure, such that the particular data store (e.g., data store 216a) describes a study (i.e., a medical journal article, doctor's notes, engineering notes, financial reports, etc.) about the particular entity represented in the graph database 202.

Figure 3:
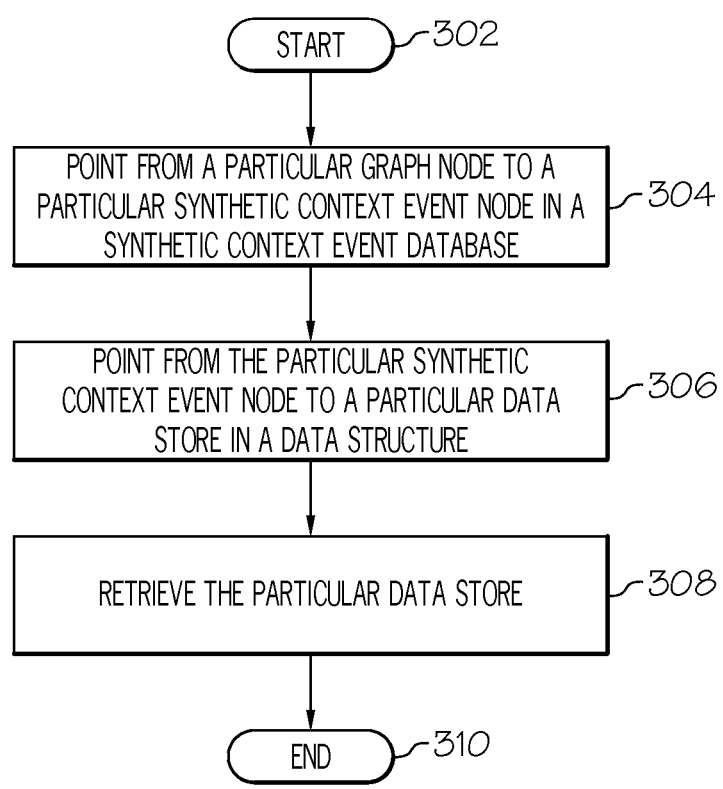
FIG. 3 is a high-level flow chart of one or more steps performed by a computer processor to locate data stores related to an entity represented by a set of one or more nodes in a graph database.

With reference now to FIG. 3, a high-level flow chart of one or more steps performed by a computer processor to locate data stores related to an entity represented by a set of one or more nodes in a graph database is presented. After initiator block 302, a processor points (e.g., using a first pointer such as first pointer 218a shown in FIG. 2) from a particular graph node (e.g., graph node 208b) in a graph database (e.g., graph database 202) to a particular synthetic context event node (e.g., synthetic context event node 214a) in a synthetic content event database (e.g., synthetic context event database 204 (block 304). The graph database comprises multiple graph nodes, wherein each of the multiple graph nodes stores an attribute of a particular entity that is described by the particular graph node. Each of the multiple graph nodes is logically coupled to another graph node by an edge, which describes a relationship between entities represented by coupled graph nodes.

The synthetic context event database comprises multiple synthetic context event nodes. Each of the multiple synthetic context event nodes contains a descriptor of the attribute of the particular entity as well as the relationship between the particular entity and another entity represented by another graph node in the graph database.

As described in block 306, the processor then points (e.g., using a second pointer such as second pointer 220a shown in FIG. 2) from the particular synthetic context event node (e.g., synthetic context event node 214a) in the synthetic context event database to a particular data store (e.g., data store 216a) in a data structure (e.g., data structure 206). Thus, pointing to the particular synthetic context event node and the particular data store associates the particular data store with the particular entity (which is represented by a graph node in the graph database) via the particular synthetic context event node.

As described in block 308, the identified data store (e.g., data store 216a) is then retrieved (e.g., for display, printing, etc.) and sent to a computer system, requesting entity, etc. The process ends at terminator block 310.

While the present invention has been described in the context of a graph node searching for a data store, in one embodiment the process works in the other direction. That is, a particular data store can search for a particular graph node. For example, assume that data store 216a is a medical journal article about a particular disease (e.g., cancer). Continue to assume that, as described above, data store 216a is linked by second pointer 220a to synthetic context event node 214a, which leads a user to graph node 208b. At this point, a user who initially only knew about the medical journal article represented as data store 216a also now knows not only about graph node 208b, but also knows about linked graph nodes 208a and 208n. For example, if graph node 208b represented a particular genetic marker, which may or may not have been mentioned in the medical journal article, and graph nodes 208a and 208n represent other genetic markers, then knowing about these related genetic markers (through the use of the processes described herein) allows the user to expand his data store search. In this example, the user is able to traverse from the newly-identified graph node cluster 212 and/or graph node 208a or graph node 208n to data store 216c and/or data store 216n. That is, the present invention enables the user to identify data store 216c and/or data store 216n, through the use of synthetic context event node 214b, which is pointed to by first pointer 218b from the graph node cluster 212 and/or graph node 208a and/or graph node 208n. Note that data store 216c and/or data store 216n may be another medical journal article, a set of medical examination results (e.g., X-rays, MRIs, lab workups, etc.), etc., which may be in any digital format (e.g., PDF, JPEG, MPEG, .doc, etc.). In this example, note that data store 216n is accessible only via synthetic context event node 214b, while data store 216c is accessible via synthetic context event node 214a or synthetic context event node 214b.

In another embodiment, knowing about data store 216a enables the user to also know about data store 216b and data store 216c, since synthetic context event node 214a not only points to data store 216a but also to data store 216b and data store 216c. Thus, the synthetic context event node 214a, which is defined by the graph database features described above, allows the user to make a direct connection between different data stores within the data structure 206 via the synthetic context event node 214a, such that data store 216b and/or data store 216c can be located and/or retrieved based on the user's awareness of data store 216a.

As described in the example shown in FIG. 2, data store 216n is accessible only via synthetic context event node 214b, while data store 216c is accessible via synthetic context event node 214a or synthetic context event node 214b. If data store 216a is used to locate additional related data stores within the data structure 206, then data store 216c can be located directly via the synthetic context event node 214a. However, in order to locate/retrieve data store 216n based on awareness of data store 216a, a pathway through synthetic context event node 214a must be traversed to the graph database 202, and then returning through the synthetic context event node 214b in order to locate/retrieve the data store 216n via the pointers described herein.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A context-based system for searching for data stores related to a set of one or more nodes in a graph database, the context-based system comprising:
  a graph database computer hardware storage system, wherein the graph database computer hardware storage system contains a graph database comprising multiple graph nodes, wherein each of the multiple graph nodes stores an attribute of a particular entity that is described by a particular graph node with relation to a synthetic event, wherein said each of the multiple graph nodes is logically coupled to another graph node by an edge, and wherein the edge describes a relationship between entities represented by coupled graph nodes;
  a first pointer, wherein the first pointer points from the particular graph node to a particular synthetic context event node in a synthetic context event database, wherein the articular synthetic context event node represents the synthetic event, wherein the synthetic event is fabricated by consolidating information from different sources, and wherein the synthetic event is not an actual event;
  a synthetic context event database computer hardware storage system, wherein the synthetic context event database computer hardware storage system contains the synthetic context event database, wherein the synthetic context event database comprises multiple synthetic context event nodes, wherein each of said multiple synthetic context event nodes contains a descriptor of said attribute of the particular entity and said relationship between said particular entity and another entity represented by another graph node; and
  a second pointer, wherein the second pointer points from the particular synthetic context event node in the synthetic context event database to a particular data store in a data structure, wherein the first pointer and the second pointer associate the particular data store with the particular entity represented in the graph database via the particular synthetic context event node.

2. The context-based system of claim 1, wherein the particular data store describes an activity related to the particular entity.

3. The context-based system of claim 1, wherein the second pointer uses a keyword that is in both the particular synthetic context event node and the particular data store to point to the particular data store.

4. The context-based system of claim 1, further comprising:
  a cluster of related graph nodes in the graph database, wherein the first pointer points to a synthetic context event node that contains a descriptor of all attributes of the cluster of related graph nodes and all relationships described by edges that connect the cluster of related graph nodes.

5. The context-based system of claim 1, wherein multiple second pointers point from the particular synthetic context event node to multiple data stores in the data structure.

6. The context-based system of claim 1, wherein a first second pointer from a first synthetic context event node and a second second pointer from a second synthetic context event node point to a same data store in the data structure.

7. The context-based system of claim 1, wherein the data structure is a relational database, and wherein the particular data store is a tuple within the relational database.

8. The context-based system of claim 1, wherein the data structure is a text data structure, and wherein the particular data store describes a study about the particular entity represented in the graph database.

9. A processor-implemented method of searching for data stores related to a set of one or more graph nodes in a graph database, the processor-implemented method comprising:
   pointing, by a processor, from a particular graph node in a graph database to a particular synthetic context event node in a synthetic context event database, wherein the particular synthetic context event node represents a synthetic event, wherein the synthetic event is fabricated by consolidating information from different sources, wherein the synthetic event is not an actual event, wherein the graph database comprises multiple graph nodes, wherein each of the multiple graph nodes stores an attribute of a particular entity that is described by the particular graph node with relation to the synthetic event, wherein said each of the multiple graph nodes is logically coupled to another graph node by an edge, wherein the edge describes a relationship between entities represented by coupled graph nodes, wherein the synthetic context event database comprises multiple synthetic context event nodes, wherein each of said multiple synthetic context event nodes contains a descriptor of said attribute of the particular entity and said relationship between said particular entity and another entity represented by another graph node; and
   pointing, by the processor, from the particular synthetic context event node in the synthetic context event database to a particular data store in a data structure, wherein pointing to the particular synthetic context event node and the particular data store associates the particular data store with the particular entity represented in the graph database via the particular synthetic context event node.

10. The processor-implemented method of claim 9, wherein the particular data store describes an activity related to the particular entity.

11. The processor-implemented method of claim 9, wherein the second pointer uses a keyword that is in both the particular synthetic context event node and the particular data store to point to the particular data store.

12. The processor-implemented method of claim 9, further comprising:
   pointing, by the processor, from a cluster of related graph nodes in the graph database to a specific synthetic context event node, wherein the specific synthetic context event node contains a descriptor of all attributes of the cluster of related graph nodes and all relationships described by edges that connect the cluster of related graph nodes.

13. The processor-implemented method of claim 9, wherein multiple second pointers point from the particular synthetic context event node to multiple data stores in the data structure.

14. The processor-implemented method of claim 9, wherein a first second pointer from a first synthetic context event node and a second second pointer from a second synthetic context event node point to a same data store in the data structure.

15. The processor-implemented method of claim 9, wherein the data structure is a relational database, and wherein the particular data store is a tuple within the relational database.

16. The processor-implemented method of claim 9, further comprising: retrieving, by the processor, the particular data store.

17. A computer program product for searching for a set of one or more graph nodes in a graph database that are related to a data store in a data structure, the computer program product comprising:
   a non-transitory computer readable storage medium;
   first program instructions to point from a particular data store in a data structure to a particular synthetic context event node in a synthetic context event database, wherein the particular synthetic context event node represents a synthetic event, wherein the particular synthetic context event node represents a synthetic event, wherein the synthetic event is fabricated by consolidating information from different sources, wherein the synthetic event is not an actual event, wherein the synthetic context event database comprises multiple synthetic context event nodes, wherein the particular synthetic context event node contains a descriptor of an attribute of a particular entity represented by a particular graph node in a graph database with relation to the synthetic event, wherein the particular synthetic context event node further contains a relationship described in an edge between said particular graph node and another graph node in the graph database; and
   second program instructions to point from the particular synthetic context event node in the synthetic context event database to the particular graph node in the graph database, wherein pointing to the particular synthetic context event node and the particular graph node associates the particular data store with the particular entity represented by the particular graph node via the particular synthetic context event node; and wherein
the first and second program instructions are stored on the non-transitory computer readable storage medium.

18. The computer program product of claim 17, further comprising:
   third program instructions to point from a related graph node in the graph database to a specific synthetic context event node, wherein the related graph node is linked by one or more edge to the particular graph node, and wherein the specific synthetic context event node contains a descriptor of attributes of the related graph node and all relationships described by edges that connect the related graph node to the particular graph node; and
   fourth program instructions to point from the specific synthetic context event node to a specific data store in the data structure, wherein the particular data store and the specific data store are different data stores; and wherein
the third and fourth program instructions are stored on the non-transitory computer readable storage medium.

19. The computer program product of claim 17, further comprising:
   third program instructions to point from a cluster of related graph nodes in the graph database to a specific synthetic context event node, wherein the cluster of related graph nodes is coupled by at least one edge to the particular graph node, and wherein the specific synthetic context event node contains a descriptor of all attributes of the cluster of related graph nodes and all relationships described by edges that connect the cluster of related graph nodes; and fourth program instructions to point from the specific synthetic context event node to a specific data store in the data structure, wherein the particular data store and the specific data store are different data stores; and wherein the third and fourth program instructions are stored on the non-transitory computer readable storage medium.

20. The computer program product of claim 19, further comprising: fifth program instructions to retrieve the specific data store; and wherein the fifth program instructions are stored on computer readable storage medium.

\* \* \* \* \*